Oct. 9, 1928.  
H. W. HYDE  
1,686,561  
SPRING SUSPENSION FOR VEHICLES  
Filed Aug. 24, 1923

Inventor:
Harry Webb Hyde,
By Macleod, Calver, Copeland & Dike,
Attorneys.

Patented Oct. 9, 1928.

1,686,561

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR VEHICLES.

Application filed August 24, 1923. Serial No. 659,095.

This invention relates to vehicle spring suspensions of the general type shown and described in my prior application for Letters Patent, filed September 29, 1921, Serial No. 504,160, Patented Jan. 27, 1925, No. 1,524,437 of which the present case is a division in part and with respect to such subject matter as it has in common therewith.

As explained in said prior application, the invention consists primarily in providing the vehicle with longitudinal springs or spring reaches connected at their ends, either directly or indirectly, with the axles, and in supporting the body on the spring reaches intermediate the ends of the latter in such a manner as to permit said body to rock with respect to and independently of the reaches upon a horizontal, transverse axis, so that tilting or rocking of the reaches, caused by a vertical movement of either the front or rear wheels and the axle carried thereby, will not be transmitted to the body and will not tend to tip or pitch the same, said body being permitted, by rocking about its axis with respect to the reaches, to maintain its substantially horizontal position, its only movement being a slight vertical one in a substantially rectilinear direction.

The present invention has for its object to provide a form of spring suspension of the general type above referred to in which notwithstanding the pivotal mounting of the body on the reaches, the stability of the former is provided for without the use of balancing springs or any other connection between the body and axles except the pivoted reaches, thereby securing to the fullest degree the advantages of the principle referred to. This is accomplished by the use of two pairs of spring reaches to both of which the vehicle body is pivotally connected, the whole constituting a duplication of the simplest form of suspension of this type.

The foregoing and other objects of the invention, together with means whereby the same may be carried into effect, will best be understood from the following description of certain forms or embodiments thereof illustrated in the accompanying drawings. It will be understood, however, that the particular constructions and arrangements described and shown have been chosen for illustrative purposes merely and that the invention, as defined by the claims hereunto appended, may be otherwise practiced without departure from its spirit and scope.

Figure 1:
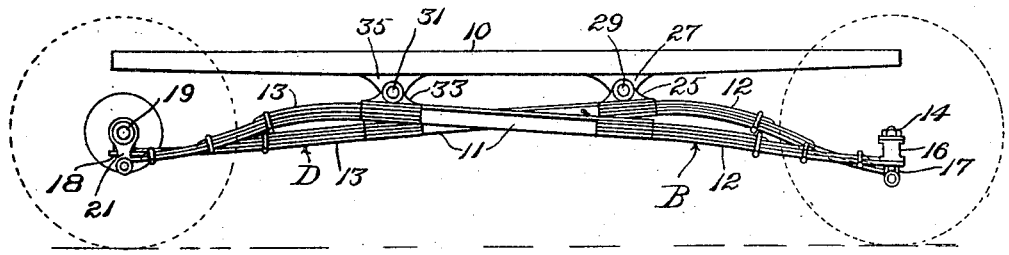
Figure 2:
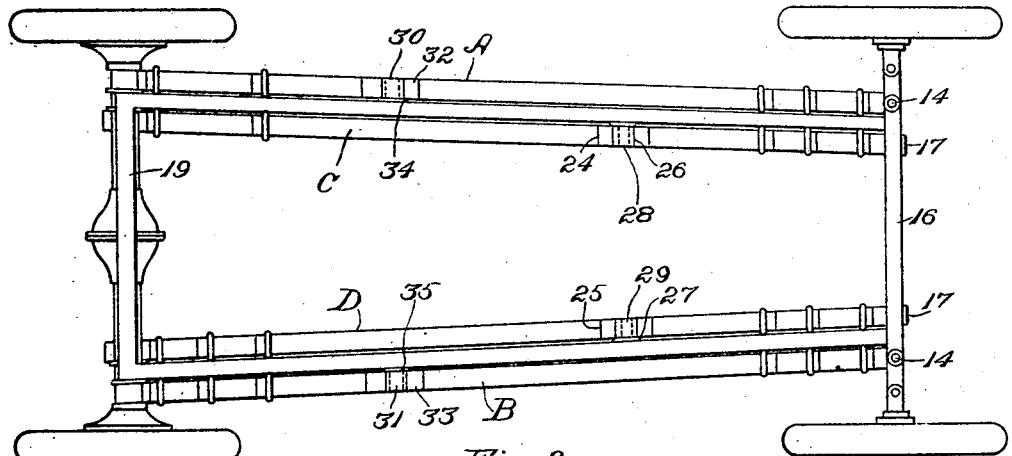

In said drawings, Fig. 1 is a side elevation and Fig. 2 a plan view of a spring suspension embodying the invention.

Figure 3:
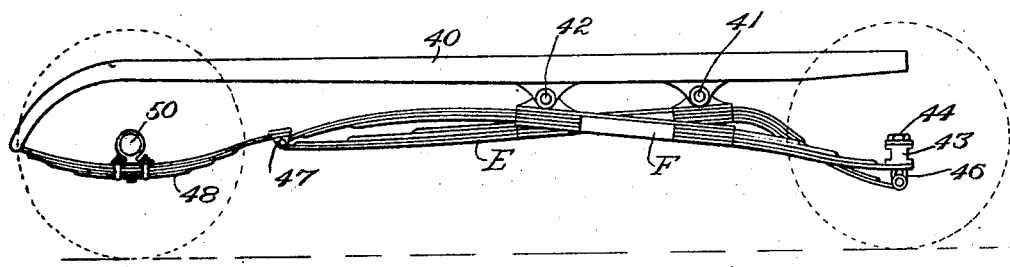

Fig. 3 is a view similar to Fig. 1, illustrating a modification.

The principle of operation of a spring suspension of the general type of that to which the present case relates is fully explained in my prior patent above referred to. For the purposes of the present description this principle may be briefly outlined as follows:

In the ordinary vehicle, whether provided with elliptical, semi-elliptical, or cantilever springs, the springs are, in effect, rigidly secured to the body or frame, and any shock or blow on a wheel, due to unevenness in the road, which causes the wheel to rise or fall suddenly, is communicated directly to the body.

In the type of spring suspension to which the present invention relates, on the contrary, if the front wheel, for example, be raised, owing to the unevenness in the road, the tendency is for the spring reach to turn about the pivot afforded by the rocker on which the body is supported, but not to rock the body. It thus tends to swing the rear end of the reach and rear axle downward about the pivot, so that the chief effect of the blow is transmitted to the rear wheels and absorbed by the pneumatic tires thereon. Likewise, when the rear wheel goes over an obstruction or drops into a hole, the front wheels and tires receive the major part of the reaction and the body is affected relatively little. In any event, any lifting force, or the resultant of such lifting forces as may be transmitted to the body as a result of the rocking of the reaches, is so applied that there is no gyratory force acting eccentric to the center of gravity. The effect on the body is merely to lift the pivot, and consequently the body, vertically to a slight extent, and not to rock said body from front to back, so that the body is not given any pitching motion.

Referring now to Figs. 1 and 2 of the drawings, the four spring reaches comprising the two pairs above referred to are therein designated A, B, C and D, of which A and B constitute one pair, while C and D constitute the other. Each of these reaches consists of a substantially rigid steel beam 11, to each end of which is rigidly secured a series of spring leaves of proper shape, as shown at 12 and 13. The bottom leaf at the front end of each of the outside reaches A and B is rigidly secured to the front axle 16 as by a bolt 14, while the bottom leaf at the front end of each of the inside reaches C and D is suspended from said axle by a shackle 17. This arrangement provides for unequal elongation of the reaches for reasons which will be apparent. At the rear of the vehicle, a reverse arrangement is employed. The inside reaches C and D are bolted at 18 to the rear axle 19, while the outside reaches A and B are suspended by shackles 21 from the rear axle.

The inside reaches C and D carry upwardly extending brackets 24 and 25 cooperating with downwardly extending brackets 26 and 27 on the body frame 10, and these brackets are connected by two pivots 28 and 29 which form an axis on which the frame can rock with relation to this pair of reaches. This axis is located forward of the center of gravity of the body. The outside pair of reaches A and B are likewise connected to the frame 10 by pivots 30 and 31 engaging respectively two pairs of brackets 32 and 33, and 34 and 35. These pivots are located behind the center of gravity of the body.

In Figure 3 is shown a modification of the construction above described. As shown in this figure, the inside reaches E and outside reaches F are pivotally connected, in substantially the manner above described, to the body frame 40 at points 41 and 42, respectively, which are so located that a point midway between them is forward of the center of gravity of the body 40, said points 41 and 42 being preferably both forward of said center of gravity. As in the form of the invention shown in Figs. 1 and 2, the forward ends of the spring reaches are connected with the front axle 43, the bottom leaf of the front end of each of the outside reaches F being rigidly secured to said axle by a bolt 44, and the bottom leaf of the front end of each of the inside reaches E being suspended below the front axle by a shackle 46. In this form of the invention, however, the rear ends of said spring reaches are not connected in a corresponding way to the rear axle 50, but are connected by shackles 47 with the forward ends of semi-elliptical springs 48 supported by said rear axle. The forward ends of the springs 48 constitute extensions of the spring reaches, connecting the latter with the axle 50, while the rear ends of said springs 48 at the opposite sides of said axle are pivotally connected with the rear end of the body frame 40. In this form of the invention, the resultant of the upward forces transmitted to the body 40 at the points 41 and 42 at which said body is connected to the spring reaches, is applied to said body at a point forward of the center of gravity thereof, and the rear end of said body, at the opposite side of its center of gravity, is acted upon by the rear ends of the springs 48, which constitute balancing springs operating, as more fully explained in my prior patent above referred to, to balance the forces about the center of gravity of the body when the rear axle is raised. When the front axle 43 is raised, tending to raise the forward end of the body, the spring reaches, rocking upon the body, will, through the springs 48 acting as levers fulcrumed upon the rear axle 50, tend to lift the rear end of the body also, thereby preventing pitching of the latter in accordance with the principles more fully explained in another application filed May 28, 1923, Serial No. 641,933.

In this specification, the phrase "spring reaches" is employed as a comprehensive term to denote longitudinal members through which the body is supported from the axles and composed wholly or in part of springs. The term, therefore, is to be taken as including a unitary spring as well as a reach composed of a substantially rigid beam to the ends of which are attached springs. It will be understood that when the spring reach is constructed as last described, and as herein shown, the connection between the beam and the springs is a rigid one in the sense that there is no pivotal or other movable connection at this point.

The words "rear," "front," and similar expressions are herein used as convenient illustrative terms, it being obvious that, although the constructions shown are preferred for most purposes, the suspensions might be oppositely disposed. These and other modifications of the construction shown will, however, be readily apparent to those skilled in the art without further description in detail.

What I claim is:

1. An improved spring suspension for motor vehicles comprising two pairs of spring reaches, each supported at its opposite ends from the axles of the vehicle and both pairs of reaches extending between the same two axles, and a pair of pivotal connections for each pair of reaches, said pairs of pivotal connections being separated from each other lengthwise of the body.

2. In combination, the front and rear axles of a motor vehicle and its body, two pairs of spring reaches each supported at its opposite ends from said axles respectively and each consisting of a nonresilient section and two spring members, and two pairs of pivotal connections each pair connecting the body and the non-resilient portions of one pair of spring reaches, one pair of pivotal connections being between the center of gravity of the body and the rear axle and the other pair being between said center of gravity and the front axle.

3. In a vehicle having axles and a body, a spring suspension comprising two pairs of spring reaches each connected at both ends with the axles and both pairs extending between the same two axles, and spaced connections between the body and each pair of reaches upon which the former is adapted to rock with respect to the latter about a transverse axis, each of said connections being at one side of the centre of gravity of the body.

4. In a vehicle having axles and a body, a spring suspension comprising two pairs of spring reaches each connected at both ends with the axles and both pairs extending between the same two axles, and a connection between the body and each pair of reaches upon which the former is adapted to rock with respect to the latter about a transverse axis, said axes being separated from each other lengthwise of the body.

In testimony whereof I affix my signature.

HENRY WEBB HYDE.